United States Patent
Kresta

[11] 4,029,138
[45] * June 14, 1977

[54] TIRE BLANK FOR A VEHICLE TIRE WITH TIRE BEAD PLY MEANS AND IMPROVED VEHICLE TIRE FORMED THEREFROM

[75] Inventor: Erich Kresta, Perchtoldsdorf, Austria

[73] Assignee: Semperit Aktiengesellschaft, Vienna, Austria

[*] Notice: The portion of the term of this patent subsequent to Apr. 15, 1993, has been disclaimed.

[22] Filed: Jan. 20, 1975

[21] Appl. No.: 542,275

Related U.S. Application Data

[62] Division of Ser. No. 304,208, Nov. 6, 1972, Pat. No. 3,878,013.

[30] Foreign Application Priority Data

Nov. 10, 1971 Austria .............................. 9717/71

[52] U.S. Cl. .......................... 152/362 R; 152/354; 152/362 CS
[51] Int. Cl.² ........................................ B60C 15/06
[58] Field of Search ......... 152/362 R, 362 CS, 374, 152/354; 156/123, 131, 132

[56] References Cited

UNITED STATES PATENTS

| 2,888,058 | 5/1959  | Manis et al. ................. | 152/362 CS |
| 2,947,342 | 8/1960  | Holloway ..................... | 152/362 CS |
| 2,947,343 | 8/1960  | Sjothun ....................... | 152/362 CS |
| 3,612,137 | 10/1971 | Guyot ........................... | 152/362 R  |
| 3,759,306 | 9/1973  | Masson et al. ............... | 152/374    |

FOREIGN PATENTS OR APPLICATIONS

| 138,067 | 6/1934 | Austria ........................ | 152/362 CS |
| 843,991 | 8/1960 | United Kingdom ......... | 152/362 CS |

*Primary Examiner*—Drayton E. Hoffman
*Attorney, Agent, or Firm*—Werner W. Kleeman

[57] ABSTRACT

A tire blank for a vehicle tire provided at its bead region or surface with a pre-vulcanized ply or a ply formed of a harder rubber mixture than the rubber mixture generally employed at the bead region. Each bead region of the tire blank possesses one such ply at its inner surface, and both plies are arranged at a spacing from one another.

14 Claims, 11 Drawing Figures

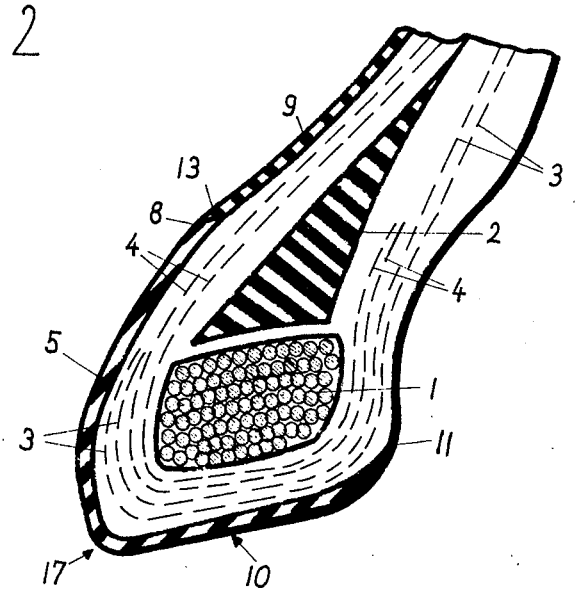
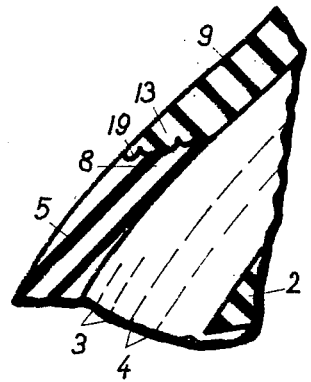

TIRE BLANK FOR A VEHICLE TIRE WITH TIRE BEAD PLY MEANS AND IMPROVED VEHICLE TIRE FORMED THEREFROM

CROSS-REFERENCE TO RELATED CASE

This is a divisional application of my copending, commonly assigned United States application Ser. No. 304,208, filed Nov. 6, 1972, now U.S. Pat. No. 3,878,013, granted Apr. 15, 1975.

BACKGROUND OF THE INVENTION

The present invention relates to new and improved constructions of tire blanks for vehicle tires of the type provided at their bead region or surface with a pre-vulcanized ply or a ply consisting of a harder rubber mixture than the rubber mixture usually employed at the bead region.

Such constructions are known to the art, as exemplified for instance in French Pat. No. 2,023,015. With these state-of-the art constructions the ply consists of a layer having increased hardness relative to the neighboring rubber layer or ply, so that the loads exerted by the wheel rim shoulder or rim flange can be absorbed much better. A drawback of the known constructions resides in the fact that during build-up of the tire, especially during bowing or dishing thereof, deformations occur at the region of the carcass assembly due to compression of both bead regions, these deformations oftentimes resulting in kinking or buckling. Furthermore, it has been found that due to the formation of cavities at the inside of the tire it is impossible to prevent the formation of fissures which again, during vulcanization, produce sealing difficulties.

Although such drawbacks do not arise with other known tire constructions wherein some possess a continuous inner plate at the inside of the tire, yet such tire constructions are extremely difficult to dish or bow.

SUMMARY OF THE INVENTION

Therefore, it is a primary object of the present invention to provide a new and improved construction of tire blank for a vehicle tire and improved vehicle tire formed therefrom which is not associated with the aforementioned drawbacks and limitations of the state-of-the-art proposals.

Another and more specific object of the present invention aims at overcoming the drawbacks of the prior art constructions while retaining the advantages thereof and, in particular, producing a tire blank and improved tire formed therefrom which, on the one hand, can be easily dished or bowed without the use of a bellows or bag during the course of manufacture thereof, and, on the other hand, does not lead to the formation of kinks or the like in the carcass as well as not having the tendency towards forming fissures or cracks, and furthermore does not exhibit any sealing problems during vulcanization.

Now in order to implement these and still further objects of the invention, which will become more readily apparent as the description proceeds, the invention starts from the previously mentioned prior art construction and fulfills the aforementioned objectives essentially in that the aforementioned ply is provided at the inner surface of the bead region of the tire. In particular, each bead region of the tire is provided with one such ply at its inner surface and both of the plies are spaced from one another. Consequently, there is avoided the formation of fissures and kinks in the carcass during compression of the ends of the beads during bagless or bellowless dishing of the tire blank since the ply, which functions in the manner of a reinforcement of the bead region of the tire, during dishing of the tire blank, prevents the bead region from being buckled or kinked or in some other manner impermissively loaded. Also the tire blank dishing operation is no longer difficult since the ply, which owing to its greater hardness could hinder such dishing, is only advantageously provided at the bead region of the tire. Significantly, this ply is not present at the sidewall and tread region of the tire, and consequently does not produce at those locations difficulties as concerns the dishing or bowing of the tire blank.

The bead region of the tire or tire blank is to be understood to define that region which comes into contact with the wheel rim. It is approximately equal to that region of the tire which, during loading of the tire, is not subjected to the squeezing action because it is supported by the wheel rim.

It is advantageously within the contemplation of this invention to guide the ply about the root or toe of the bead and, if desired, to draw such upwardly along the outer surface of the tire bead. As already mentioned, it is known to the art to use at this region a ply formed of a harder rubber mixture. This ply can be integral with the ply located at the inner surface of the tire so that during build-up of the tire blank on a tire build-up drum no additional work is necessary. Additionally, there is thereby realized the advantage that none of these plies are located at regions of the bead end of the tire which are particularly loaded. Hence, deformation of the bead during vulcanization cannot arise, since during vulcanization a harder ply supports and retains the bead region.

It has been found to be advantageous if, according to the invention, the reinforcement ply at the inner surface of the tire only extends up to the transition region between the sidewall and bead region of the tire. At this location the reinforcement ply can either terminate or transform into an inner plate known as such to the art which is not prevulcanized. In order to provide for a gradual transition it is a further aspect of the invention to construct the edge of the reinforcement ply neighboring the sidewall with a tapered portion. This tapered portion insures for a gradual transition with the neighboring portions of the tire. According to the invention the tapered portion is advantageously overlapped at the inside of the tire by the edge of the neighboring layer. Such overlapping is more favorable than a butt joint since the adhering surface, by means of which the pre-vulcanized ply merges with the neighboring plies is increased. The arrangement of the over-lapping edge of the neighboring layer at the inside of the tire is more favorable for the reason that in this manner the tip formed by the tapered end of the pre-vulcanized ply is embedded between non-pre-vulcanized plies and in this way secured much better.

A further possibility of forming the tapered portion at the pre-vulcanized ply or a ply formed from a harder rubber mixture can be realized according to the invention in that the ply consists of a number of layers which are offset in a steplike fashion from one another. In this way there are realized better sealing characteristics at the joint between the prevulcanized ply or the ply formed by the harder rubber mixture and the neighboring ply, for instance an inner plate which is not pre-vulcanized, so that there can be avoided penetration of air during vulcanization at such joint owing to the labyrinth arrangement which is provided by the steps or gradual transitions. The step-shaped construction of the tapered portion can be easily realized during tire fabrication in the drum wind-up or build-up operation in that the layers are applied in a spiral-shaped formation and/or helical-shaped formation to the tire build-up or winding drum.

Another improvement as concerns avoiding, during vulcanization, penetration of air at the joint between the prevulcanized ply or the harder ply and the neighboring ply, especially the inner plate, can be realized according to a further aspect of this development which contemplates appropriately profiling the plies extending in the peripheral direction of the tire. Such profiling can be provided both at the bevelled tapered portion of the end of the ply as well as also at that side surface of the ply where such bears against the tire bead. The neighboring layer, especially the inner plate, engages with such profiling, so that there is realized so to speak a tooth-like meshing action between these two layers.

In order to improve upon the adhesion properties of the ply formed as a pre-vulcanized ply it is within the contemplation of this invention to provide such ply with an adhering layer or coating. Furthermore, it is recommended according to the invention to provide the ply with a reduced thickness or with recesses at the concave side of the flexed or bent portions in order to improve upon the kinking or buckling behavior at the region of the flexed or bent portions. Consequently, the bending characteristics of the pre-vulcanized ply are favorably enhanced during dishing without reducing the protective action of such pre-vulcanized ply or the ply consisting of a harder rubber mixture at the bead end. The ply recesses confronting the bead simultaneously form an anchoring for the ply at the bead, since during vulcanization the material of the neighboring plies of the bead can flow into the portions of the recesses which remain after dishing.

The reinforcement ply at the inner surface of a strip advantageously possesses, according to a further aspect of the invention, prior to vulcanization a modulus of elasticity with 200% elongation of $M_{200} = 45-70$ kp/cm$^2$, preferably 50–65 kp/cm$^2$. Experiments have shown that these values are particularly suitable.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a fragmentary sectional view through the bead end of a second embodiment of inventive vehicle tire;

FIG. 6 illustrates details of the ply used in the embodiment of FIG. 5 prior to bending undertaken during the course of dishing;

FIGS. 8, 9 and 10 illustrate respective sectional views of three variant constructional embodiments for improving the adherence of the ply with the neighboring tire portions.

DETAILED DESCRIPTION OF THE PREFERRED EMBODIMENTS

Figure 1:
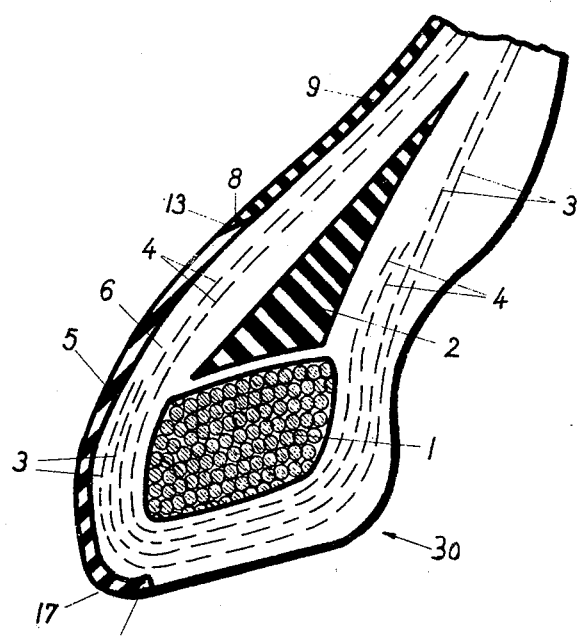
FIG. 1 is a fragmentary sectional view through a bead end of a first embodiment of vehicle tire.

Turning now more specifically to the drawings, it is to be understood that only enough of the tire construction will be shown to simplify clarity in illustration and as is necessary for those skilled in the art to understand the underlying concepts of this development. Directing attention therefore specifically to the showing of FIG. 1, it will be seen that at each bead end region 30 of the tire there is arranged a bead core 1 formed of wire and at which merges a bead wedge 2. A number of carcass layers 3, 4 are wrapped about the bead core 1 and the bead wedge 2. At the inner surface of the tire there is arranged a pre-vulcanized ply 5 of greater hardness than the neighboring layers. If desired, the ply 5 can constitute a ply formed of a rubber mixture of increased hardness. The modulus of elasticity of this ply 5 for 200% elongation prior to vulcanization amounts to $M_{200} = 45-70$ kp/cm$^2$, preferably 50–65 kp/cm$^2$. The Shore hardness of such pre-vulcanized ply or layer 5 is greater than that of the neighboring plies and amounts to about 85, whereas the Shore hardness of the neighboring rubber layer 6 amounts to about 55. During fabrication of the tire, especially during the bellowless dishing and during vulcanization, the ply 5 functions as a reinforcement or stiffening for the bead, so that the clamping portion of the tire formed by the bead is stable and rigid and therefore does not tend towards impermissible deformations during fabrication which could produce kinks, buckling or fissures, especially at the region of the carcass assembly.

Figure 10:
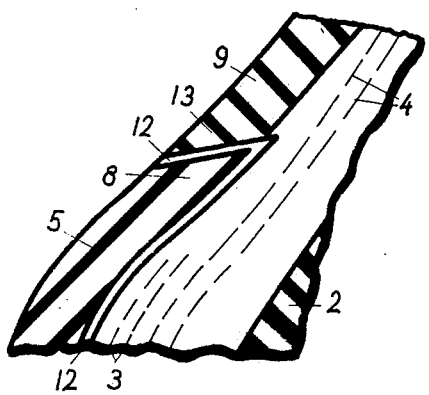

As will be apparent, the pre-vulcanized ply 5 is drawn upwardly from the bead root or toe 7 along the inner surface of the tire up to approximately that region which during loading of the tire during running is not subjected to the squeezing action, because it is supported by the wheel rim. Generally such is the region which comes into contact with the wheel rim. In the exemplary embodiment under consideration the ply 5 extends approximately to one-half of the height of the bead wedge 2 and at that location is provided with a tapered portion 8 by means of which the ply 5 gradually transforms into a conventional non-prevulcanized inner plate or liner 9 which extends over the remaining portion of the inner surface of the tire. As should be further apparent the inner plate 9 overlaps the ply 5 in such a way that the inner surface of the tire the inner plate 9 extends by means of its edge 13 further downward than the ply 5. This overlapping arrangement is more advantageous than the reverse arrangement since the pointed tapered edge of the ply 5 is thus located at the inside. Consequently, there is prevented detachment of this pointed converging edge of the tapered portion 8, so that during vulcanization there is prevented penetration of air at this location. This is particularly of importance when using a ply 5 formed of pre-vulcanized material, since the pre-vulcanization generally reduces the adhesion properties of the ply 5 with the neighboring plies. This adherence capability can be, however, again increased in that the ply 5 is provided with an adhering layer or coating 12 formed of a material suitable for such purposes as is well known in this art, and as best seen by referring to FIG. 10.

Figure 11:
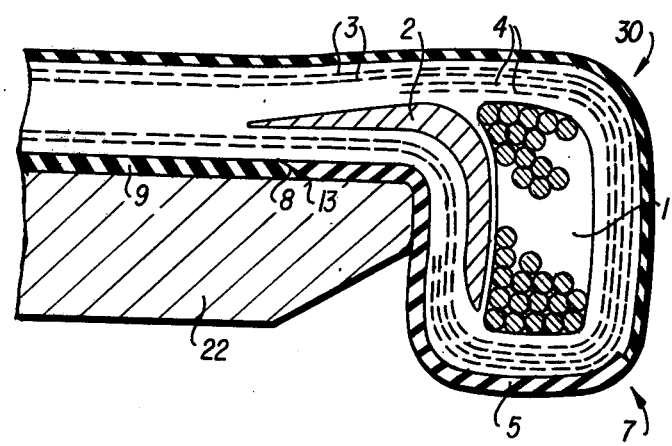
FIG. 11 is a fragmentary sectional view of the bead end of the first embodiment shown during build-up of the tire on a tire build-up drum.

The embodiment of the invention of FIG. 1 is illustrated in FIG. 11 during fabrication of the tire on a tire build-up drum 22. As will be clear from the showing of FIG. 11, the pre-vulcanized ply 5 of greater hardness is arranged in such a way that it confronts the tire build-up drum 22 to reinforce the bead portion of the tire during build-up. In this manner, the ply 5 prevents excessive deformations of the bead region which could lead to difficulties during subsequent bellowless dishing and vulcanization of the tire. The various portions of the tire blank identified by reference numeral designations in FIG. 11 correspond to the similarly identified portions of the tire shown in FIG. 1. Thus, reference numeral 7 identifies the toe of the bead region of the tire at which point the pre-vulcanized ply 5 begins and extends over the inner portion of the bead region, about the edge of the tire build-up drum 22 and inwardly therefrom to adjoin the inner plate 9 of the tire blank confronting the outer peripheral surface of the drum 22.

After build-up of the tire blank on the drum, the blank is thereafter dished or bowed in a bellowless vulcanization apparatus to conform substantially to its final cross-sectional shape. During this dishing procedure, the tire clamping arrangement of the bellowless device engages the pre-vulcanized ply 5 of the bead region. Because of the rigidity of the ply 5 and the absence of deformations therein, kinks, fissures and buckling of the clamped bead region during bellowless dishing are advantageously prevented.

Figure 3:
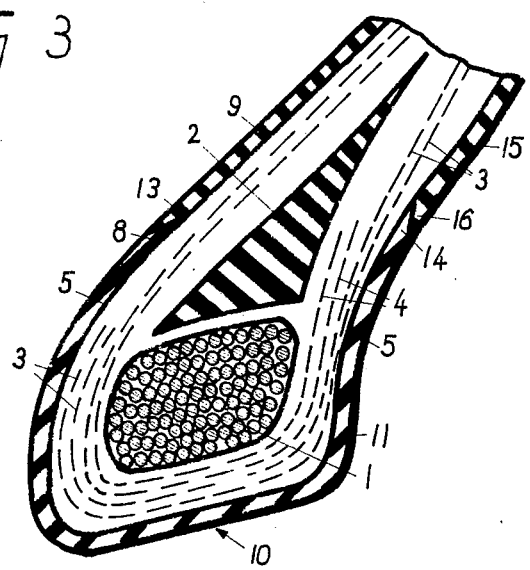
FIG. 3 is a fragmentary sectional view through the base end of a third embodiment of inventive tire.

The embodiments of FIGS. 2 and 3 differ from that of FIG. 1 in that the ply 5 is guided about the bead root or toe portion 17 as well as about the region 10 (bead base) of the tire which bears at the rim shoulder or flange, as best seen by referred to FIG. 2, and if desired a piece or portion thereof can be pulled upwardly at the outer surface 11 of the bead, as best seen by referring to the embodiment of FIG. 3. These portions of the ply 5 are formed of one piece with the portion, which has been depicted in FIG. 1, so that the entire ply 5 forms a coherent or uniform entity which holds the highly-loaded portion of the bead end.

With the embodiment of FIG. 3 the end of the ply 5 lying at the outside of the tire bead is likewise provided with a tapered portion 14 which is overlapped by the edge 16 of the neighboring layer 15.

Figure 4:
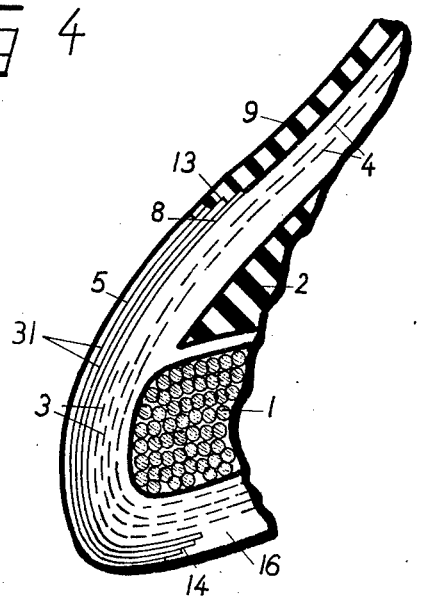

The tapered portion need not be constructed so as to continuously extend in tapered fashion, as such has been depicted for the embodiments of FIGS. 1 to 3. For instance, as shown with the embodiment of FIG. 4 it also can be designed to extend in a step-like fashion. Consequently, there is produced a toothlike transition of the ply or layer 5 into the neighboring layers. For constructing such tooth arrangement it is recommended that the ply 5, during fabrication of the tire, be formed of a number of layers, for instance in the arrangement of FIG. 4 from four layers 31, which are offset in a step-shaped fashion with regard to one another. This can be easily realized during tire manufacture in that the layers are applied to the conventional winding or build-up drum in a spiral-shaped formation and/or a helical-shaped formation. This type of layer formation is known as such in the art. As depicted in FIG. 4 the stepped portions are situated in such a way that the tapered portions 8 or 14 respectively of the ply 5 which are formed thereby are overlapped by the neighboring layers 9 and 16 respectively.

Figure 5:
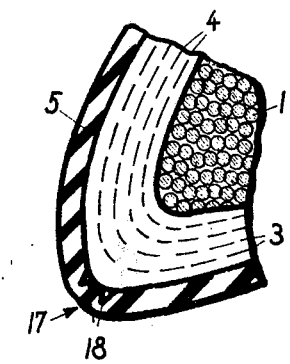
FIGS. 4 and 5 are respective sectional views through the bead root or toe region of a tire.

With the embodiment of FIG. 5 the ply 5 exhibits a number of recesses 18 at the region of the bead root or toe 17 for the purpose of improving the kinking or buckling behavior. These recesses 18 are formed by grooves provided at the prevulcanized layer 5, the grooves being triangular in cross-section, as best seen by referring to FIG. 6 depicting the ply in its extended state prior to dishing. Such grooves 18 facilitate the bending and kinking process of the pre-vulcanized layer during the bellowless dishing or arching of the tire blank, wherein the hollow cavities or compartments of such grooves 18 which remain following dishing of the tire blank are filled during vulcanization by the flowing rubber material from the neighboring layers of the bead root or toe. In this way there is realized an anchoring of the ply 5 at such layers of the bead root, so that the coherency of all of the layers is improved.

Figure 7:
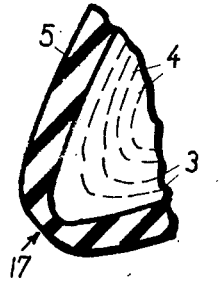
FIG. 7 illustrates a modified embodiment from that shown in FIG. 5.

In addition to the construction of such recesses 18 or in lieu thereof the ply 5 can exhibit at the region of its bowed or flexed portions an irregular thickness, as depicted for the embodiment of FIG. 7. Also in this way there is improved the kinking- and bending behavior of the ply 5.

Figure 9:
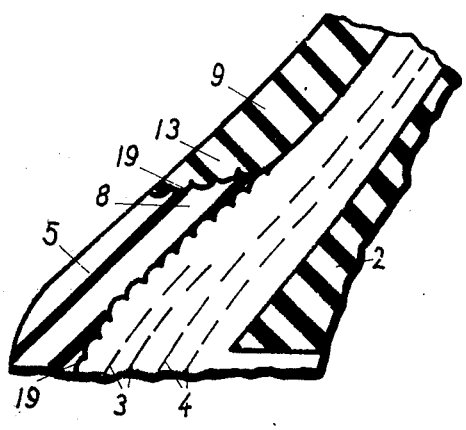

A further improvement of the adherence of the ply 5 with the neighboring layers or plies can be realized in that the ply 5 is provided at the joint surface of its tapered portion 8 with profiled portions 19 which extend in the circumferential direction of the tire, as best seen by referring to FIG. 8. These profiled portions or profiling 19 can be provided in the same or different embodiments also at those surfaces of the ply 5 which bear against the carcass assembly 3, 4 of the bead toe. In this regard attention is directed to FIG. 9. Such profiled portions produce teeth into which can flow, during vulcanization, the material of the neighboring layers and in this way improve the adhesion of the ply 5.

While there is shown and described present preferred embodiments of the invention, it is to be distinctly understood that the invention is not limited thereto, but may be otherwise variously embodied and practiced within the scope of the following claims.

What is claimed is:

1. A tire blank for a vehicle tire comprising two tire bead portions, carcass means for interconnecting the tire bead portions, an inner plate bearing against the carcass means at the inner surface of the tire, a respective ply arranged at the inner surface of the tire at each tire bead portion, each ply being arranged to confront a tire build-up drum and being formed of a rubber mixture which is selectively harder than either the rubber mixture employed at the other regions of the tire bead portions or the inner plate, or both, in order to reinforce confronting regions of the tire beads and to at least minimize the danger of damage at such tire bead regions during bellowless vulcanization of the tire blank.

2. The tire blank as defined in claim 1, wherein each bead portion has a root portion, and wherein the ply of each bead region portion is drawn about the bead root portion.

3. The tire blank as defined in claim 2, further including a core insert for each tire bead portion, the ply of each bead portion being drawn upwardly at the outer surface of the bead at most up to the extreme outer end of the core insert.

4. The tire blank as defined in claim 1, wherein each ply extends at the inner surface only up to the transition region between the tire sidewall and the bead portion of the tire.

5. The tire blank as defined in claim 1, wherein each ply possesses a modulus of elasticity with 200% elongation of $M_{200} = 45-70$ kp/cm².

6. The tire blank as defined in claim 5, wherein the modulus of elasticity $M_{200} = 50-65$ kp/cm².

7. The tire blank as defined in claim 1, wherein an adhesion layer is provided for each ply.

8. The tire blank as defined in claim 1, wherein each ply has a flexed region and is provided with a reduced thickness at the region of its flexed portion for improving the kinking behavior.

9. The tire blank as defined in claim 1, wherein each ply has a flexed portion and is provided with recesses at a concave side of the flexed portion for improving the kinking behavior.

10. The tire blank as defined in claim 1, wherein each ply is provided at its surface with which it bears against the neighboring tire portions with profiled portions extending in the circumferential direction of the tire blank.

11. The tire blank as defined in claim 1, wherein the edge of each ply neighboring the tire sidewall is provided with a tapered portion, said tapered portion being covered by the edge of a neighboring layer of the tire blank.

12. The tire blank as defined in claim 11, wherein the tapered portion is formed through the provision of a ply having a number of layers to form a ply assembly, wherein the individual layers are offset in step-like fashion from one another.

13. The vehicle tire as defined in claim 12, wherein the individual layers are wound in a substantially spiral-shaped configuration.

14. The vehicle tire as defined in claim 12, wherein the individual layers are wound in a substantialy helical-shaped configuration.

* * * * *